(No Model.)
W. W. HARRIS.
COMBINED COTTON SEED DRILL AND FERTILIZER DISTRIBUTER.
No. 289,771. Patented Dec. 4, 1883.
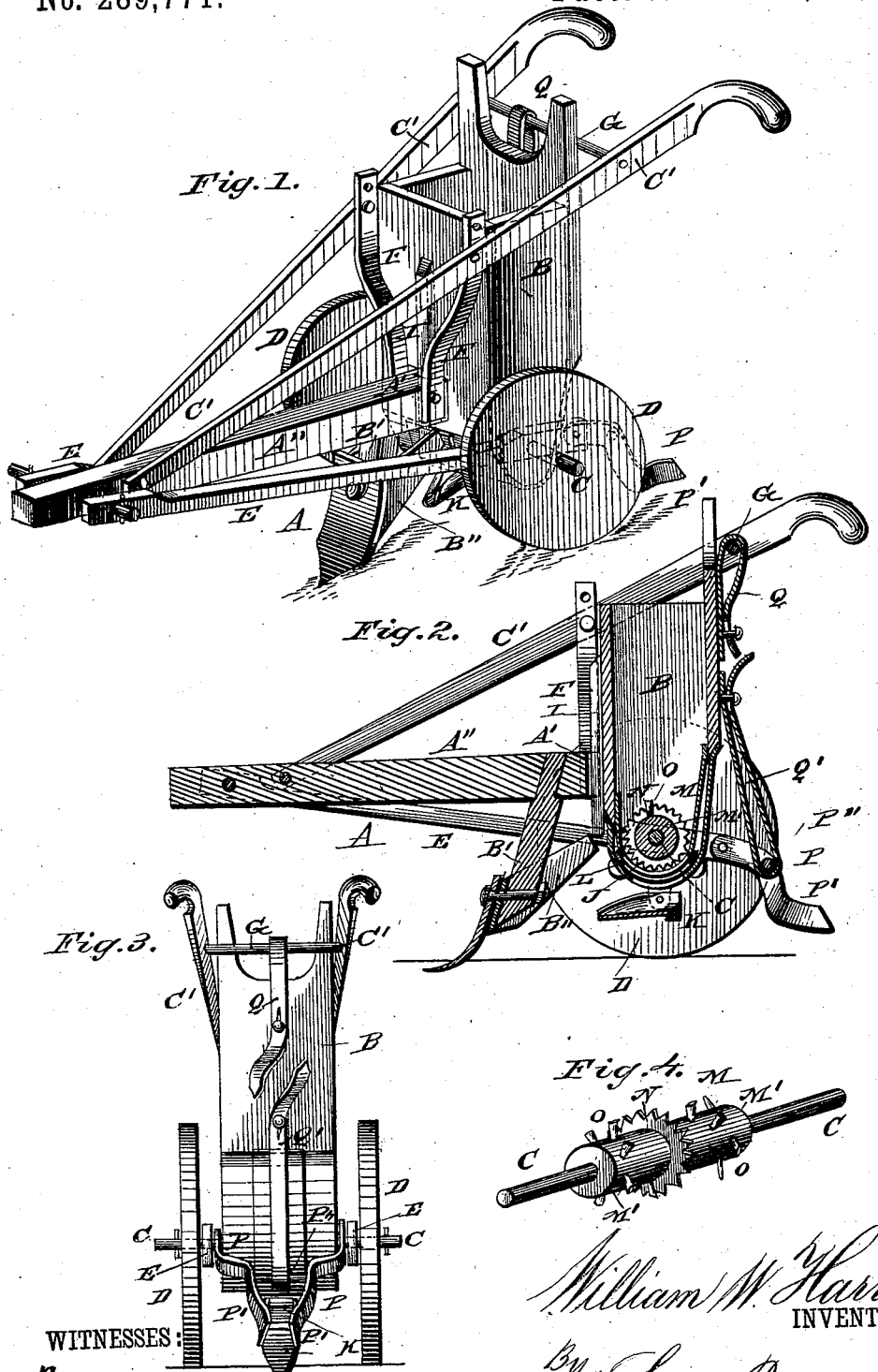

United States Patent Office.

WILLIAM W. HARRIS, OF SPARTANBURG, SOUTH CAROLINA, ASSIGNOR OF ONE-FOURTH TO JOHN W. HOLTZCLAW, OF SAME PLACE.

COMBINED COTTON-SEED DRILL AND FERTILIZER-DISTRIBUTER.

SPECIFICATION forming part of Letters Patent No. 289,771, dated December 4, 1883.

Application filed August 20, 1883. (No model.)

*To all whom it may concern:*

Be it known that I, WILLIAM W. HARRIS, a citizen of the United States, and a resident of Spartanburg, in the county of Spartanburg and State of South Carolina, have invented certain new and useful Improvements in a Combined Cotton-Seed Drill and Guano-Distributer; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved seed-drill and fertilizer-distributer. Fig. 2 is a longitudinal vertical sectional view of the same. Fig. 3 is a rear elevation of the same, and Fig. 4 is a perspective detail view of the rotary feeder.

Similar letters of reference indicate corresponding parts in all the figures.

My invention has relation to combined seed-drills and fertilizer-distributers; and it consists in the improved construction and combination of parts of the same, as will be hereinafter more fully described and claimed.

In the accompanying drawings, A represents a plow of ordinary construction, the rear end of the plow-beam A" being provided with a vertical recess, A', for the purpose hereinafter described.

Upon the lower end of the plow-standard B' is secured an attachment, B", which consists of a single piece of metal having its ends bent back at right angles to each other, and secured upon the plow-standard by the same bolt which holds the plowshare in position. The object of this attachment is to prevent the earth from falling into the furrow before the fertilizer is deposited within the furrow.

B represents a hopper, which is supported upon an axle, C, having wheels D, of ordinary or suitable construction.

Upon the ends of the axle C, between the wheels D and the sides of the hopper, are journaled the ends of shafts E, the forward ends of which are pivoted upon either side of the forward part of the plow-beam, the hopper B being of such a size as to fit between the handles C' of the plow, the braces F and cross-beam G of the plow-frame serving to hold the hopper in a vertical position as it slides between them. A vertical strip or guiding-piece, I, on the front side of the hopper, fits within the vertical recess A' in the rear end of the plow-beam, and serves as a guide for the plow-beam as the latter is raised or lowered, as hereinafter specified.

B indicates the hopper, which is preferably made of a rectangular shape, having in its lower rounded end a slot or opening, J, extending across the bottom of the hopper in a line with the plow-beam, a removable spout, K, being hinged by its upper end immediately below this slot or opening. This spout, which may be removed from the hopper when the latter is being used for drilling seed, is weighted at its back near its upper end, the object of this arrangement being to incline the lower end of the spout forward, so as to throw the guano or other fertilizer into the furrow close to the plowshare, thus putting the fertilizer into the furrow before any loose earth has an opportunity to roll into the same and choke it up. The slot or opening J is provided with a slide, L, by which the amount of fertilizing compound fed through the said slot may be regulated.

C indicates the axle, which is preferably made of iron, and has its ends made of a square or hexagonal shape, to adapt them to fit within the hubs of the wheels D, by which arrangement the axle is caused to revolve with the wheels.

M represents the feeder, which is shown in detail in Fig. 4, and consists of a toothed wheel, N, resembling in shape a circular saw, which is secured upon the center of the axle D, and two wooden cylinders, M', placed upon the axle D—one on either side of the toothed wheel N—secured upon the axle by means of suitable screws, and provided with teeth O, arranged around them spirally, in such a manner as to work the contents of the hopper toward the slot J. The toothed wheel N acts as a saw in separating or cutting up the fertilizing compound into fine particles, by which arrangement I avoid choking up the opening or slot J, as would otherwise be the case.

P represents the removable coverer, which consists of two bars, P', of iron or steel, which are connected by a cross-piece, P'', the lower ends of these bars being flattened and bent so as to leave a small ridge of earth behind them, the upper ends of the bars P' being loosely pivoted to the rear ends of the shafts E, by which arrangement the coverer adjusts itself to the ground, and only slides upon the same. The coverer is prevented from dropping, when the hopper is raised, by a strap, Q', fastened from the cross-piece of the coverer to the back of the hopper. The coverer can be weighted, when necessary, by passing weights upon the strap Q' and letting them rest upon the cross-piece of the coverer.

Q indicates a strap connecting the hopper to the cross-beam G of the plow-frame, which may be used by the operator in raising the hopper, and which prevents the operator from raising the plow so high as to allow the hopper to drop back. It will be seen that the hopper B, with its wheels and shafts E, is independent of the plow A, and can therefore be readily slid up and down or adjusted vertically by means of the strap Q.

From the foregoing description, taken in connection with the accompanying drawings, the construction and operation of my improved seed-drill and fertilizer-distributer will readily be understood without requiring further explanation.

It will be seen that by constructing my improved seed-drill and fertilizer-distributer in the manner described the plow can be operated to cut a furrow of any desired depth without its movements being impeded in any way by the seed-drilling and fertilizer-distributing attachment, the hopper adjusting itself to the irregularities of the ground, so as to add nothing to the weight of the plow.

By removing the bolt which holds the front end of the shafts E to the front of the plow-beam, the whole attachment can be easily removed, so as to leave a good plow for ordinary purposes.

By constructing the feeder M in the manner described, the spirally-arranged teeth O will feed the fertilizing compound toward the central slot, J, while the toothed wheel N will separate the fertilizer into fine particles and prevent it clogging up the slot J.

By pivoting or hinging the spout at its upper end, it will be allowed to swing back when its lower end strikes against a stone or other obstruction, by which arrangement I prevent the spout from being broken off, which would happen if the spout were rigidly attached to the hopper, while, after the spout has passed the obstruction, the weight attached upon its back, near its upper end, will cause it to swing back into its normal position.

Having thus described my invention, I claim and desire to secure by Letters Patent of the United States—

In a combined seed-drill and fertilizer-distributer, the hopper B, having the feeder M, consisting of a toothed wheel, N, secured concentrically upon the axle C at its center, and the wooden cylinders M', secured upon the axle C—one on either side of the central toothed wheel, N—and provided with teeth O, arranged around them spirally, and provided with a slot, J, slide L, adapted to regulate the amount passing through said slot, spout K, hinged near its upper end beneath the slot J, and weighted near its upper end to adapt it to automatically adjust itself, removable coverer P, having strap Q', and longitudinal rib or feather I, secured upon the front side of the hopper, arranged and combined as and for the purpose shown and set forth.

In testimony that I claim the foregoing as my own I have hereunto affixed my signature in presence of two witnesses.

WILLIAM W. HARRIS.

Witnesses:
   CHAS. P. WOFFORD,
   W. G. THOMASON.